H. DEUTSCH.
PROCESS FOR THE MANUFACTURE OF SAUSAGE SKINS AND THE LIKE.
APPLICATION FILED SEPT. 7, 1912.

1,076,005. Patented Oct. 14, 1913.

UNITED STATES PATENT OFFICE.

HERMANN DEUTSCH, OF SZABADKA, AUSTRIA-HUNGARY.

PROCESS FOR THE MANUFACTURE OF SAUSAGE-SKINS AND THE LIKE.

1,076,005. Specification of Letters Patent. Patented Oct. 14, 1913.

Application filed September 7, 1912. Serial No. 719,168.

*To all whom it may concern:*

Be it known that I, HERMANN DEUTSCH, a subject of the King of Hungary, residing at Szabadka, in the county of Bács-Bodrog, Austria-Hungary, have invented certain new and useful Improvements in the Process for the Manufacture of Sausage-Skins and the like, of which the following is a specification.

This invention has for object to provide an improved process for the manufacture of skins or bags and the like from animal skin for holding meat, sausage meat, and other articles of food.

It has already been proposed to manufacture sausage skins or bags of any desired diameter from the intestines of animals by slitting open and drying the fresh or salted intestines and then uniting at their edges the skins thus obtained, for instance by sewing the edges together.

Now the improved process consists in taking the skins of intestines which have been cleaned, polished and prepared in any known manner and which do not form closed sleeves and therefore do not require to be slit open, and stretching them wet over a mandrel of wood or other material and then sticking or cementing them together along their meeting edges. When these stretched skins have become dry, the bags thus formed are detached and removed from the mandrel. A sausage skin or bag of this kind may be fastened along any desired line of aperture by sticking or cementing the meeting edges over one another after the fashion of the well known paper bag fasteners. The fastening or the bottom of the skin or bag may also be made of a different shape and fixed in separately.

By this invention sausage skins or bags may be made in any desired width from animal intestinal membranes. They may also be made of any desired length by sticking or cementing a number of such bags one to the other.

One example of the invention is illustrated in the accompanying drawings in which:—

Figure 1:
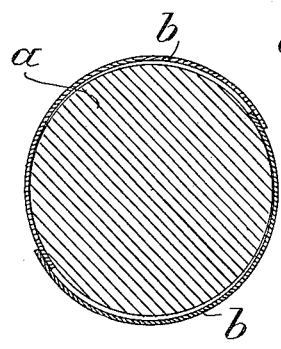
Figure 2:
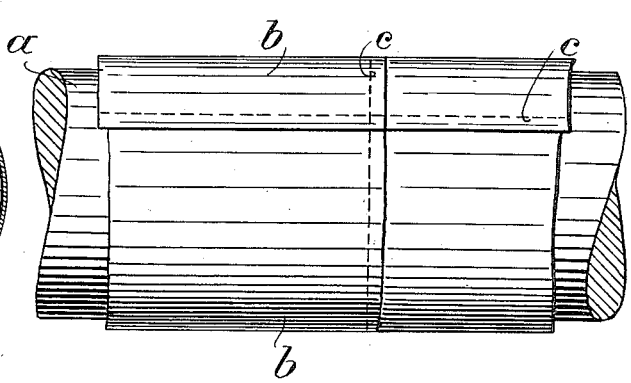

Figure 1 shows a section of the mandrel and of the intestine casings, and Fig. 2 shows a side view.

In the drawings $a$ is the mandrel, $b$ the intestinal membranes and $c$ the pasted meeting edges.

Having now described my invention what I claim as new and desire to secure by Letters Patent is:—

A process for the manufacture of bags from animal intestinal membranes for holding meat, sausage meat or other articles of food, which consists in taking the skins or intestines which have been cleaned, polished and prepared in the usual manner, and stretching them while wet over a mandrel and uniting or cementing them together at their meeting edges, and when dry detaching and removing them from the said mandrel.

In testimony whereof I have signed my name to this specification in the presence of two subscribing witnesses.

HERMANN DEUTSCH.

Witnesses:
 JOSEPH WIRKMANN,
 HUGH KEMINY.